(12) United States Patent
Izundu et al.

(10) Patent No.: US 7,400,586 B2
(45) Date of Patent: Jul. 15, 2008

(54) COLLABORATIVE REMOTE COMMUNICATION CIRCUIT DIAGNOSTIC TOOL

(75) Inventors: Anthony E. Izundu, Matawan, NJ (US); Jay M. Stiles, Watchung, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 957 days.

(21) Appl. No.: 10/374,284

(22) Filed: Feb. 25, 2003

(65) Prior Publication Data

US 2004/0165533 A1 Aug. 26, 2004

(51) Int. Cl.
*H04J 1/16* (2006.01)

(52) U.S. Cl. .................. 370/241; 370/251; 702/108; 379/1.01

(58) Field of Classification Search .......... 370/241, 370/251, 241.1, 242, 247, 248, 249; 702/108, 702/183; 375/224, 222, 228; 379/1.01, 14.01
See application file for complete search history.

(56) References Cited

U.S. PATENT DOCUMENTS

| | | | |
|---|---|---|---|
| 5,173,896 A | | 12/1992 | Dariano |
| 5,553,059 A | * | 9/1996 | Emerson et al. ............. 370/248 |
| 5,822,603 A | * | 10/1998 | Hansen et al. ................. 712/1 |
| 5,964,891 A | * | 10/1999 | Caswell et al. ................ 714/31 |
| 6,857,013 B2 | * | 2/2005 | Ramberg et al. ............ 709/223 |
| 6,891,851 B1 | * | 5/2005 | Demakakos ................ 370/467 |
| 7,127,506 B1 | * | 10/2006 | Schmidt et al. ............. 709/224 |

\* cited by examiner

*Primary Examiner*—Chi H. Pham
*Assistant Examiner*—Alexander Boakye
(74) *Attorney, Agent, or Firm*—Muncy, Geissler, Olds & Lowe, PLLC

(57) ABSTRACT

The invention is a diagnostic tool for collaboratively testing a T1 line from remote terminals. A Diagnostic Interface Unit (DIU) containing test and monitoring equipment is connected into a T1 line close to a demarcation point. Testing from that common point, to either end of the T1 line is then performed by one or more operators at remote terminals. The operator terminals are connected via the Internet, to a common server in communication with the DIU. The operators each see the same page of a Diagnostic Web Service (DWS). Using the DWS, one of the operators causes the DIU to be switched into the T1 line and the T1 line configured and tested. All operators see the test setup and results on their own screens in real-time, making this remote testing equivalent to the operators meeting at the demarcation point and jointly testing from that point out.

20 Claims, 4 Drawing Sheets

COLLABORATIVE REMOTE COMMUNICATION CIRCUIT DIAGNOSTIC TOOL

FIELD OF THE INVENTION

The present invention relates to communication circuit diagnostic tools and particularly to apparatus and methods for remote, collaborative diagnosis of digital communication circuits, and more particularly to T1 lines.

BACKGROUND OF THE INVENTION

Modern digital communications circuits are complex devices that contain, and are connected to, many active components. Testing them is difficult. This difficulty is compounded by the fact that a typical communications line is only maintained and operated by the service provider up to the point at which it enters the customer premises. Beyond that point of entry, termed the demarc or demarcation point, the line and the equipment attached to it is the responsibility of the customer.

When a fault occurs on a line, the service provider and the customer try to determine the location and cause of the fault by each testing the line on their side of the demarcation point. However, even the simplest digital line such as a T1 line, is a complex system, as described in detail by, for instance, U.S. Pat. No. 5,173,896 to Dariano entitled "T-carrier network simulator", the contents of which are hereby incorporated by reference.

A typical issue that arises in attempting to test such T1 lines is that neither the service provider nor the customer are always entirely sure that they are actually testing to the demarcation point. The demarcation point is usually a physical Network Interface Unit, sometimes referred to as a "Smart Jack" because it is capable of responding to commands to set itself into a loop back mode. However, other components that may be attached to the line may also setup loop-backs at other points. It is also common for physical loop backs to be setup for local testing or to avoid alarm signals reaching other parts of the system. In a complex network a tester may not be aware that these loop backs are in place and may erroneously think they have tested the circuit to the demarcation point when in reality they have only tested it as far as some physically set loop-back put in place because of some other problem or test program.

Another common situation is that different spans of a T1 may be incompatibly configured. The portion of the T1 line and associated equipment on the enterprise or customer side may, for instance be configured for D4 framing, while the service provider T1 and equipment may be configured for ESF framing. In such a circumstance, each party tests and finds their span to be operational, but the complete line does not work.

That situation is often compounded by each group only knowing their own test equipment, and using their own jargon to describe their testing procedures. Often neither side understands or is convinced by the other sides test procedures.

All too often these types of issue give rise to a situation where both the service provider and the customer claims to have tested the communications line on their side of the demarcation point and found no fault, but the line is still not operational. Resolving such standoffs can be a costly and time wasting exercise. In practice, resolution of such standoffs is often only achieved when technicians from both the service provider and the customer meet at the demarcation point and jointly test the line. They do this in order to be sure that the line is really being tested from the demarcation point in each direction. Moreover, such a meeting allows them to test the line with the same equipment and to each see the same results, thus helping resolve any issues of whether the tests are appropriate, the results conclusive or the configurations different. However, such meetings can be difficult to schedule and costly, both in terms of the technicians' time and in the downtime of the line.

What is needed is a simple way to diagnose communication line faults and incompatibilities that allows service provider and customer technicians to test communications lines in a way that they are all convinced that the test reaches to the demarcation point, with an agreed upon set of diagnostic tools, in a way that provides them all with the same data and understanding of that data, without the need for a costly physical meeting.

SUMMARY OF THE INVENTION

The collaborative remote communication circuit diagnostic tool of this invention provides a simple, efficient and cost effective way for testing digital communications circuits such as, but not limited to, T1 lines in a way that overcomes the problems detailed above.

In the preferred embodiment of the invention, a Diagnostic Interface Unit (DIU) containing test and monitoring equipment is associated with a T1 line at or close to the demarcation point associated with that line. A computer controlled insertion switch is also associated with the DIU. During normal operation of the T1 line, the DIU is bypassed. When testing of the T1 line is required, the DIU can be switched in line by means of the insertion switch. The DIU includes a microprocessor that controls the test and monitoring equipment and also has connections to one or more remote terminals via a communications network such as, but not limited to, the Internet.

In the preferred embodiment, testing from a common point, out to either end of the T1 line, is performed by one or more operators at remote terminals. The operator terminals are connected via a network such as, but not limited to, the Internet, to a common server that is in communication with the DIU. On their own terminals, the operators each see a common page provided by the server. This common page typically contains DIU commands and the results generated by the DIU. During the testing, the DIU insertion switch is activated, so that all traffic on the line being tested passes to or through the DIU test analyzing equipment. Under control of a remote operator, the DIU issues instructions and test signals to all the necessary T1 circuit equipment on both sides of the line demarcation. The instructions may include, but are not limited to, loop up and loop down commands. The test signals may include, but are not limited to, appropriate framing, Bit Error Rate Tests (BERTs) patterns. By this means appropriate spans and traffic are created on the T1 line so any faults can be diagnosed and located.

In one embodiment of the invention, the DIU has local storage capacity such as, but not limited to, flash memory, for storing a rolling history of the line status. This history-of-status may be recalled by the technicians as a further aid to trouble shooting.

In one embodiment, access to the microprocessor controlling the test equipment is via a suitably secure, managed Server. In order to access the control microprocessor, the remote technicians will log on to the managed Server using appropriate authentication, such as, but not limited to a username and matching password. The Server will then manage the connection to the microprocessor as well as manage communications to the remote technicians.

In another embodiment of the invention, the DIU is proactive and initiates appropriate messaging on detecting predetermined line states, such as, but not limited to, error conditions or persistence of error conditions.

In another embodiment of the invention, the DIU is proactive and if appropriate, initiates repair of the line by for instance, but not limited to, reframing data on one span to a form appropriate for a second span. This repair may merely be a test to confirm a diagnosis or it may act as a stopgap repair to keep equipment online.

DETAILED DESCRIPTION

During the course of this description like numbers will be used to identify like elements according to the different views that illustrate the invention.

Figure 1:
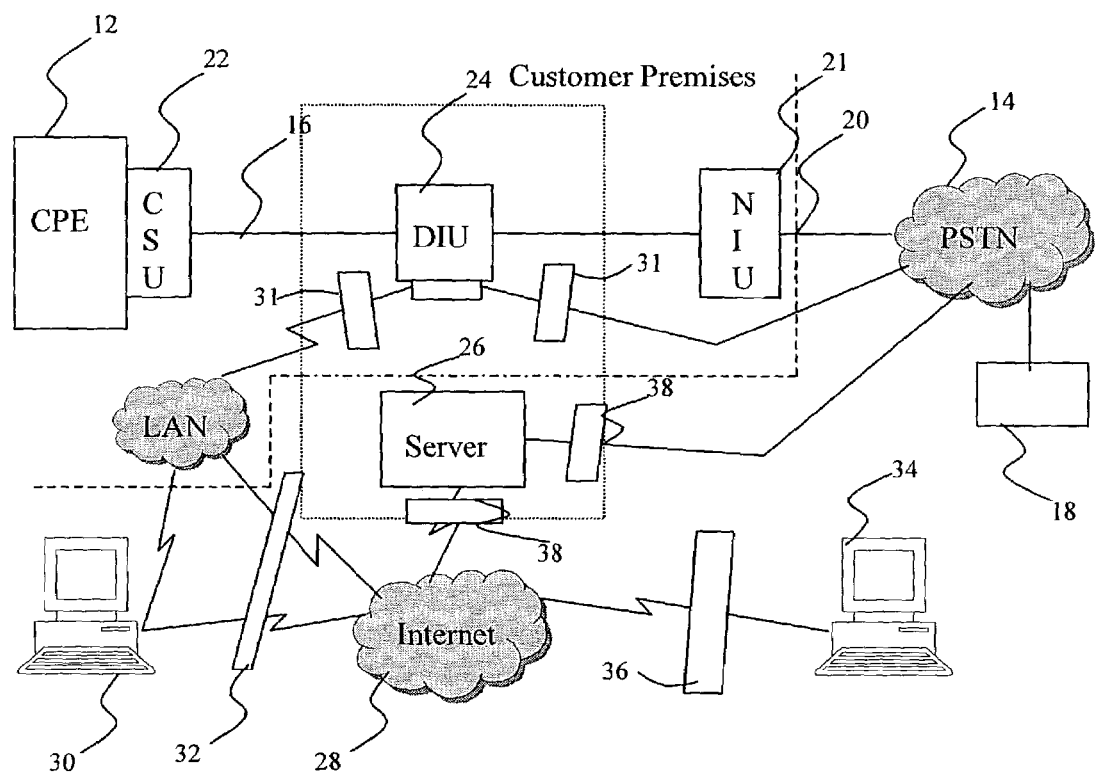
FIG. 1 is an overview of the collaborative remote communication circuit diagnostic tool of this invention.

FIG. 1 is an overview of the collaborative remote communication circuit diagnostic tool of the preferred embodiment of this invention, which is comprised of two primary components, the Diagnostic Interface Unit (DIU) 24 and the Diagnostic Web Service (DWS) which includes interface software, such as but not limited to, a Graphic User Interface and Identification Software, running on one or more servers 26. The DUI may also include software such as, but is not limited to, a configuration manager, a test-signal generator, a test-signal receiver and a communications port.

As shown in FIG. 1, in a typical communication link or path, Customer Premise Equipment (CPE) 12 is connected to the Public Switched Telephone Network (PSTN) 14 by a digital communications line 16, such as but not limited to, a T1 line. The portion of the PSTN 14 through which the digital communications line 16 connects is operated from a facilities provider center 18. The customer or enterprise is responsible for the digital communications line 16 and all the equipment attached to it on the customer or enterprise side of the demarcation point 20. Demarcation point 20 is usually the point at which the communications line 16 enters the customer premises and may consist of a Network Interface Unit (NIU), such as but not limited to a smart jack 21. The smart jack 21 is usually capable of providing simple maintenance capability such as data loop-back. On the customer side, the digital communications line 16 typically terminates in a Channel Service Unit (CSU) 22, which is capable of providing and adjusting signals to the appropriate level for the nearest repeat amplifier (not shown) connected to the line in the PSTN 14. CSU 22 is also capable of interpreting and providing appropriate framing and line coding for the communications line 16. For instance, in the case of the line being a T1 or DS1 line, the CSU 22 is capable of handling a 1.544 Mbps data stream, with the appropriate signaling scheme and framing. T1 signaling schemes include, but are not limited to, Alternate Mark Inversion (AMI) and Bipolar Eight Zero Substitution (B8ZS). The framing may for instance be no framing or any of the well-known framing protocols such as, but not limited to, D4 framing or Extended Super Frame (ESF).

The Customer Premise Equipment (CPE) 12 connected to the digital communications line 16 via the CSU 22 may include digital telecommunications equipment such as, but is not limited to, a Private Branch Exchange (PBX), a packet switch router, or a multiplexer.

The Diagnostics Interface Unit (DIU) 24 is connected into the system, typically on the customer side of the demarcation point 20. In one embodiment of the invention the DIU 24 is situated at the demarcation point 20 in place of a smart jack. The DIU is connected to one or more servers 26, either directly or via a data-link including a network such as, but not limited to the Internet 28. In the preferred embodiment, the DIU 24's data-link passes through an Identification Verifier (ID) 31 such as, but not limited to, a username and password verification software module or an appropriate biometric based security system.

Often a customer or enterprise contracts an Information Technology (IT) service provider or systems integrator to install, maintain and operate their internal equipment and communications lines. The T1 communications services are typically leased from a T1 service provider, who may in turn lease physical lines from local access providers who may own the physical connection to the customer premises. In maintaining the equipment, technical staff from all such parties may need to be involved in testing.

In the preferred embodiment, one or more IT service provider technician terminals 30, typically situated at the IT service provider premises, are connected to the DWS running on one or more servers 26 via the Internet 28. En-route to the servers 26, terminal 30's connection may pass through IT service provider's firewall 32 and an Identification Verifier (ID) 38.

In the preferred embodiment, one or more T1 service technician terminals 34 are also connected to the DWS running on one or more servers 26 via the Internet 28. En-route to the servers 26, terminal 34's typically passes through the T1 service provider's firewall 36 and the ID 38.

Figure 2:
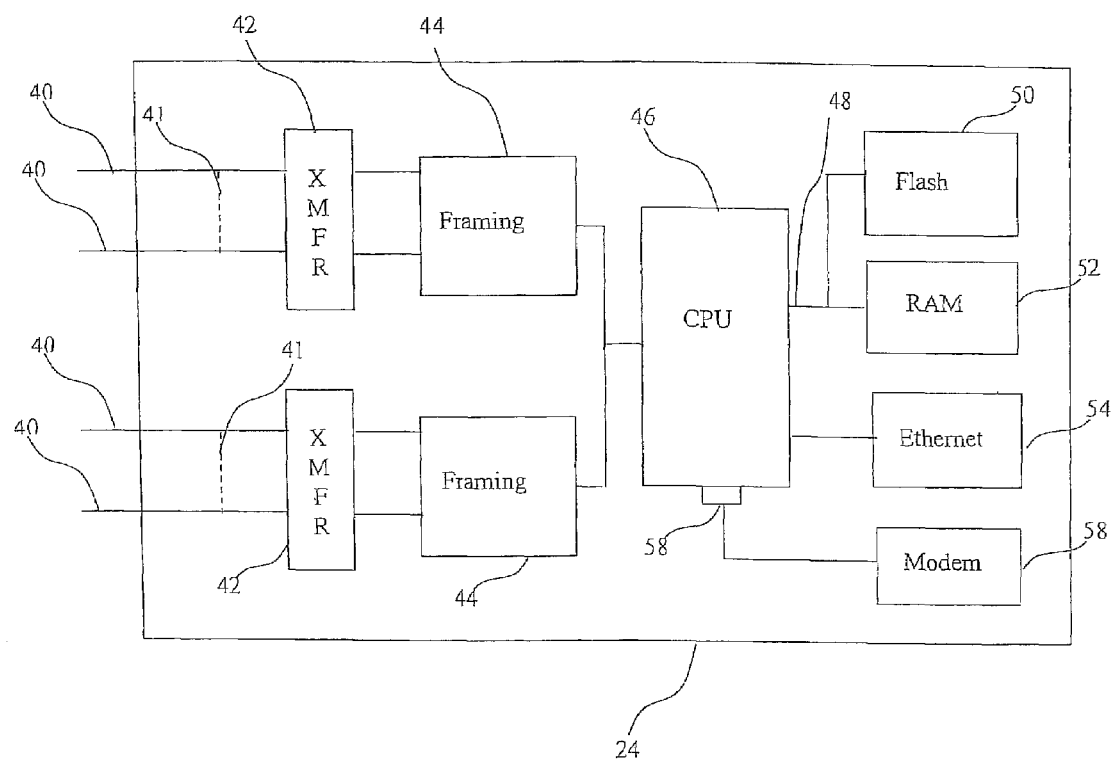
FIG. 2 is a schematic view of the Diagnostic Interface Unit of this invention.

FIG. 2 is a schematic drawing of a Diagnostic Interface Unit 24 of one embodiment of this invention. In the preferred embodiment of the invention Diagnostic Interface Unit 24 will be small box with no moving parts. It will have LED status lights, an Ethernet port (RJ45), a telephone jack (RJ11) for an internal modem and a DC power jack. An external plug-in transformer that will provide the DC power to the jack. In one embodiment, a serial port will be included so that a local technician could get access with a laptop. This may also be done using the Ethernet connection for local access. In one embodiment there will also be two RJ45 connections for the T1 line, one for the CPE and one for the incoming T1 span. During normal operation and during power failure, these T1 ports will be internally connected so that the DUI 24 will not normally interfere with data transmission. The LED's are intended to quickly identify the status of the box indicating power, alarm conditions, and whether disruptive diagnostics are currently active.

In the preferred embodiment, one or more digital, communications lines 40 are switched by a test activation switch 41 so as to pass via an isolation and impedance matching transformer 42 to a Line Interface Unit (LIU) and T1/E1 framing chip 44. This Framing/LIU chip 44 typically includes a configuration manager, a test-signal generator and a test-signal receiver. The Framing/LIU chip 44 may be, but is not limited to, the well-known PCM-Sierra Comet Quad PM4345. The PCM-Sierra Comet Quad PM4345 specifications are indicative of, but do not necessarily define, the performance requirements of a Framing/LIU chip 44 and are presented here merely to allow a more detailed understanding of the invention. It is clearly understood that a variety of framing chip-sets with significantly different capabilities could be substituted and the invention would still function. PCM-Sierra Comet Quad is a four channel combined E1/T1/J1 Transceiver/ Framer, that integrates four T1/E1 framers and line interfaces. The functionality of such a chip includes being software selectable between T1/J1 and E1 operation, providing digitally programmable pulse templates and line build-out, B8ZS, HDB3 and AMI line encoding, automatic generation of DS-1 performance reports to ANSI T1.231 and T1.408 specifications as well as PRBS generators and detectors on each tributary for error testing.

The receiver unit of the Comet Quad chip-set includes, but is not limited to, the capability to frame to DSX/DS-1 signals in SF, and ESF formats and to ITU-T G.704 basic and CRC-4 multi-frame formatted E1 signals. The Comet Quad chip-set receiver framing procedures are consistent with ITU-T G.706 specifications. The Comet Quad chip-set receiver also provides programmable in-band loop-back activate and deactivate code detection as well as diagnostic, line and per-DS0 payload loop-backs.

The Comet Quad chip-set transmitter properties include, but are not limited to, generation of DSX-1 short-haul and DS-1 long-haul pulses with programmable pulse shapes compatible with AT&T, ANSI and ITU requirements. The Comet Quad chip-set's transmitter also provides line outputs that are current limited and may be tri-stated for protection or in redundant applications as well as a digital phase locked loop for generation of a low jitter transmit clock complying with all jitter attenuation, jitter transfer and residual jitter specifications of AT&T TR 62411 and ETSI CTR 12 and CTR 13. The transmitter unit of the Comet Quad chip-set supports unframed mode and framing bit, CRC, or data link by-pass and allows insertion of framed or unframed in-band loop-back code sequences as well as transmission of the alarm indication signal (AIS) and the yellow alarm signal and provides ESF bit-oriented code generation.

In the preferred embodiment of the invention the Framing/ LIU chip 44 is under the control of a suitable Central Processing Unit (CPU) 46 microprocessor such as, but not limited to, a Motorola MPC 855T microprocessor. Motorola's MPC 855T specifications are indicative of, but do not necessarily define, the performance requirements of a microprocessor 46 and are presented here merely to allow a more detailed understanding of the invention. It is clearly understood that a variety of microprocessors with significantly different capabilities could be substituted and the invention would still function. The MPC855T is a versatile one-chip integrated microprocessor and peripheral combination designed for lower cost access equipment that requires fast Ethernet support capable of 100 Mbps. The MPC855T combines an MPC8xx core processor along with Motorola's own Communication Processor Module, a separate RISC engine specifically designed to offload communication tasks from the MPC8xx core. The MPC855T contains one Serial Communications Controller and is manufactured in Motorola's 0.32µ process technology allowing for 3.3 Volt core operation and 3.3 volt I/O. The MPC855T is also available at 50, 66, and 80 MHz. providing 105 MIPS at 80 MHz (using Dhrystone 2.1). Other typical microprocessor feature found on an MPC885T include, but are not limited to, 4-Kbyte Instruction Cache, 32 Address Lines, up to 32-Bit Data Bus, general-purpose timers, a Time-Slot Assigner, a Serial Communication Controller (SCC), a Parallel Interface Port, a PCMCIA Interface, a 4-Kbyte Data Cache and an 8 Kb Dual Port RAM.

In one embodiment of the invention, CPU 46 has a local bus 48 with access to external memory 50, which may be, but is not limited to, a suitable hard disk or a solid-state disk, such as flash memory. An example of suitable flash memory is Intel®'s 3 Volt Advanced+ (C3) and Advanced Boot Block (B3) Flash memory with 70 ns access time, a read/write and erase voltage range of 2.7-3.6 V which is available in 8- to to 64-Mbit densities. Intel®'s 3 Volt Flash memory specifications are indicative of, but do not necessarily define, the performance requirements of the external memory 50 and are presented here merely to allow a more detailed understanding of the invention. It is clearly understood that a wide variety of flash memory with significantly different capabilities could be substituted and the invention would still function.

In one embodiment of the invention, CPU 46 has a local bus 48 with access to external Random Access Memory (RAM) 52. An example of suitable RAM 52 is Kingston's MPN-KVR266X64C25/512 with 512 MB DDR SDRAM and a 266 MHz clock. Kingston's MPN-KVR266X64C25/512 specifications are indicative of, but do not necessarily define, the performance requirements of the RAM 52 and are presented here merely to allow a more detailed understanding of the invention. It is clearly understood that a wide variety of RAM 52 with significantly different capabilities could be substituted and the invention would still function.

In one embodiment of the invention CPU 46's communication port includes a 10/100BaseT connection via an Ethernet MII transceiver 54, such as but not limited to the Edimax ET-9001TX. The Edimax ET-9001TX is designed with one MII (media independent interface) connector and one RJ45 (10BaseT/100BaseTX) port that can connect to an UTP cable. Edimax ET-9001TX specifications include IEEE 802.3 10BaseT and 802.3u 100BaseTX compliance, and 110 & 100 Mbps full duplex operation with auto-negotiation. Edimax ET-9001TX specifications are indicative of, but do not necessarily define, the performance requirements of the Ethernet MII transceiver 54 and are presented here merely to allow a more detailed understanding of the invention. It is clearly understood that a wide variety of Ethernet MII transceivers 54 with significantly different capabilities could be substituted and the invention would still function.

In one embodiment of the invention, CPU 46's communication port includes a serial communications controller 56 is connected to the Internet via a modem 58. An example of suitable modem 58 is Intel's 536EP chipset that is ITU V.92 and V.90 compliant, providing data rates up to 56 kbps, uses the host CPU with minimal performance degradation. Intel's 536EP specifications are indicative of, but do not necessarily define, the performance requirements of the modem 58 and are presented here merely to allow a more detailed understanding of the invention. It is clearly understood that a wide variety of modems 58 with significantly different capabilities could be substituted and the invention would still function.

As shown in FIG. 2, there are two ways for devices to connect to the DIU 24, via the Internet and via modem. The Internet connection is always the preferred data-link. However it is expected that in most installations firewalls will not allow this type of connection, hence the modem. A Point-to-Point Protocol (PPP) stack is used for modem connections. The applications running on or interacting with the DIU 24 box behave in the same way, independent of the connection method.

Figure 3:
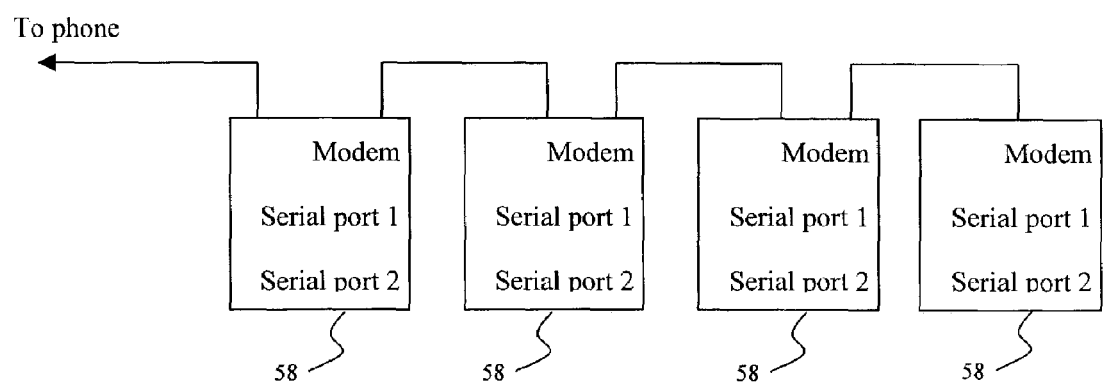
FIG. 3 is a flow diagram showing a use of the collaborative remote communication circuit diagnostic tool.

FIG. 3 is a schematic drawing showing how modems 58 associated with different DIUs 24 may be daisy-chained.

Figure 4:
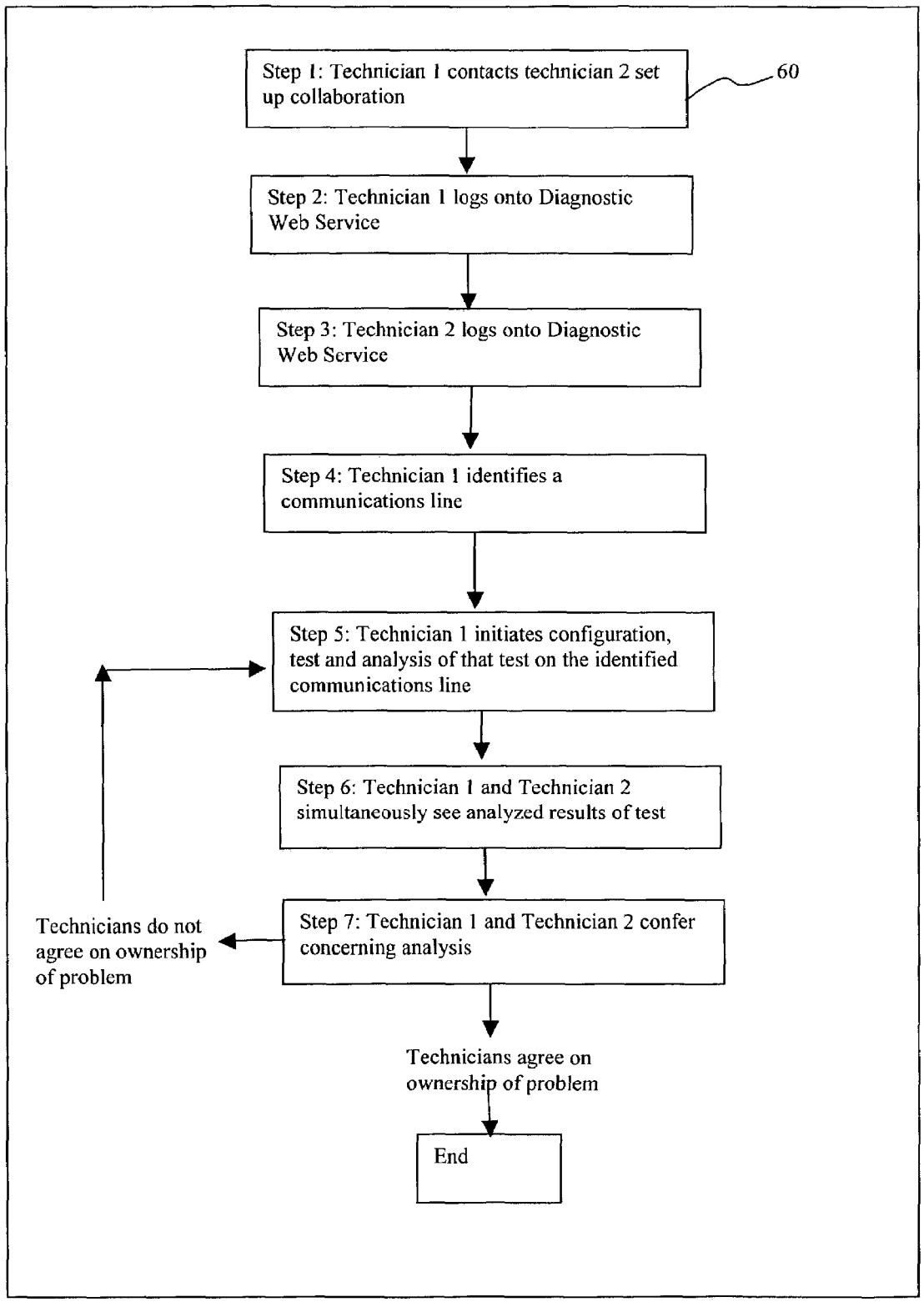
FIG. 4 is a schematic view of daisy chaining communications modems.

FIG. 4 is a flow diagram showing a use of one embodiment of the invention. In step 1, a first technician contacts a second technician in order to setup a collaboration. Although only two technicians are discussed for simplicity, it is clearly understood that the method can be extended to include as many technicians as can reasonably collaborate. Each of the technicians may represent one of the parties, such as but not limited to, the enterprise that owns or operates the so-called customer end of the communications line, an IT service provider technician, a systems integrator technician, a communications line service provider, a T1 service provider or a local access provider technician. The contact to set up the collaboration may be made by any suitable method of communication including, but not limited to a telephone call, an e-mail, a letter, an instant message or a conversation.

In steps 2 and 3 each of the technicians logs onto the Diagnostic Web

Service (DWS). This service is typically located on one or more servers remote to the terminals the technicians are operating on. The technicians' terminals are typically, but limited to, personal computers. In logging onto the DWS, each of the technicians is typically establishing a communications link over the Internet or other similar communications network. That link may entail establishing a secure encrypted tunnel via one or more of the well-known Virtual Private Network (VPN) modules. Logging on to the DWS may also include additional authorization such as, but not limited to, establishing identity by means of a user name and a password or some suitable biometric. Once logged on the DWS, each technician typically sees a common screen that may be, but is not limited to, a common web page displayed in a Graphic User Interface (GUI).

In step 4 the technicians decide or agree on what line to test. One on the technicians identifies an appropriate T1 line to test. This may for instance, be done by the technicians making a selection on the GUI, or web page displayed to them. When the choice of T1 line is made, that choice is reflected on both technicians screens. Additionally, one of the servers on which the DWS is running, then makes contact with the Diagnostic Interface Unit (DIU) linked to the selected line. In normal operation the DIU is by-passed by the communications line. On selection of a particular T1 line for testing, the DIU associated with it is switched into the line.

In step 5, the technicians initiate a test and analysis of the chosen line. This is typically done by one of the technicians selecting an option in a menu on the DWS GUI. Depending on the skill of the technicians and the type of problem being diagnosed, this selection or series of selections may range from low-level specific T1 configuration and test commands to a high-level expert system choice. In the high-level test choice, the DUI will make appropriate choice of line configuration, tests to run, analysis to perform. On completion of the tests, the DUI will run the appropriate analysis routines and send the results to the DWS for display. In another embodiment of the invention, the DWS makes some or all of the test choices and performs some or all of the analysis.

In step 6, each of the technicians sees the results of the tests or the analysis of the tests on their own monitor. The results are seen by all the technicians in real-time, that is, substantially simultaneously. There may be slight delays due to different latencies in the connections from the DWS servers to the technician monitors. There may also be some deliberate delays introduced by the DWS to compensate for the different latencies so that all information is received at the same time.

In step 7, both having the same results displayed before them, the technicians can confer. If they now agree on ownership of the problem, the collaboration may conclude and the problem owner go and initiate events to clear the problem. If there is still no clear resolution of where or what the issue is disrupting the use of the T1 line, the technicians may opt to return to step 5 and repeat the configuration setup and testing with another test.

Security concerns include ensuring that devices communicating via the modem can't gain access to the LAN and those communicating via the Ethernet port can't place modem calls or get connectivity over an existing call. Because of these and related issues, in various embodiments, communications may be unencrypted, partially encrypted or totally encrypted. There are three different types of connections to the DIU 26—Simple Network Management Protocol (SNMP) connections, configuration connections and diagnostic connections.

SNMP Connections are managed by appropriate software on the CWS 26 that support the standard Management Interface Base MIB II or logical database of configuration, status and statistical information, including that necessary for managing TCP/IP internets. A custom MIB contains configuration information for the DUI 24 and configuration/status information for the T1 line. The DUI 24 maintains the SNMP community strings and associated permissions as well as the IP addresses of SNMP managers that are supposed to receive traps or alarm messages. Each of these IP addresses either has a telephone number to reach an SNMP manager or stores direct connect address (one that is accessible over the Internet). If there are no IP addresses, then no traps or alarm messages will be sent. In one embodiment, the DUI 24 does not support sets. Sets are only be supported over the Ethernet interface.

Configuration Connections are supported by a series of configuration screens, served to the user by a web server running on the DIU24, after the user has passed a challenge response session. The appearance of this session will be the same regardless of whether the user accesses the screen via the Internet or the modem.

Diagnostic Connections will be provided via an interface defined for the DWS to communicate with the DUI 24 box.

The DUI 24 supports a Command Line Interface which includes, but is not limited to, the following set of commands, test, clear, list, help, add/delete a user, configure/view ip/snmp parameters and configure/view circuits information.

View/clear local command history, login history and DUI 24 box status.

The "test" command has a number of options, including a "test loop-up [local|near|far] circuit#" command. In the loop-up local option, the DUI 24 creates an internal analog loop back, sometimes called a line loop back, in both directions on the specified circuit. In the loop-up far, the DUI 24, sends a CSU loop-up code to the far CSU on the specified circuit. Note: if there is no CSU on the far end this command will not create a loop-back.

Another option of the "test" command is the "test loop-down [local|near|far] circuit# version". In this the loop-down local option removes an internal DUI 24 loop backs on the specified circuit. The loop-down near option sends a CSU loop-down code to the near CSU on the specified circuit. The loop-down far sends a CSU loop-down code to the far CSU on the specified circuit.

Another version of the test send pattern [near|far] circuit#. This sends the test pattern requested to either the near or far end of the specified circuit where pattern is one of the following: test monitor pattern [local|near|far] circuit#, test abort [send|loop|all] circuit#, test loopback [local|far] circuit#.

The "clear" command includes the options of "clear history [circuit#|all]" and "clear errors [circuit#|all]".

The "help" command includes the "help action" and "help action object" commands.

The Diagnostic Web Service (DWS) operates on one or more servers located remotely from the customer or enterprise premises. The DWS provides the normal technician interface into DUI 24 via the Internet. Multiple technicians can be logged into the same diagnostic session under control of the DWS. In the preferred embodiment, the user interface will be graphical in nature. Performance data resident in the DUI 24 can be accessed from CWS. Diagnostic tests can be initiated and the results viewed from the user interface of the CWS. An expert diagnostic mode can be activated in the CWS. This mode will run a suite of tests and interpret the results in an effort to localize the T1 problem.

Appropriate security measures such as, but not limited to user and password authentication, will be implemented in CWS to prevent unauthorized access to the customer's DUI 24. In addition, any data related to the customer's T1 interface may be encrypted before being transmitted.

The DWS comprises two separate parts: monitoring software, typically running on the DUI 24, and interface and diagnostics software running on server. The interface and diagnostics software typically includes a test-initiation module, capable of initiating a test protocol on said diagnostic interface unit, a test-analysis module, capable of analyzing the results of said test protocol, a GUI display module, capable of displaying, substantially simultaneously, a graphic version of the analysis of the results on each of the remote terminals. DWS will include or interface with existing support infrastructure including customer databases, ticketing systems, billing software and authentication servers.

The monitoring software will receive alarms over both the Internet and via modem connections. The monitoring platforms may include or consist of software such as, but not limited to the software used to monitor Avaya's MultiVantage PBX. DUI 24 alarms and traps may be formatted to conform to monitoring systems.

In one embodiment, the server 26 incorporates a graphical user interface (GUI) to get the current status and run diagnostics on any DUI 24 equipped T1s. Status may include T1 configuration information, active alarms, recent alarm history, and current state of the DUI 24 LEDs.

In one embodiment, users will be authenticated by a Secure Services Delivery Platform (SSDP) before they are able to run the DUI 24 software. They may only have access to USI that are listed in the customer database and which they have been given rights to access.

In a further embodiment, individual DUI 24's will incorporate the same GUI as the server.

Once a user is authenticated, it's important that they can only get to the DUI boxes that they should be authorized to access. DWS will ensure that a user from Company A sees a view of only Company A's DUI 24, and cannot see or manipulate DUI's from Company B.

In a further embodiment, there is a less privileged user of the DWS. This less privileged category of user has access to monitoring information, but is unable to initiate disruptive diagnostics.

In a further embodiment of the invention there is a Services Secure Gateway (SSG) that includes a secure encrypted tunnel across the Internet via a Virtual Private Network (VPN) between the server running the DWS and the DUI 24.

In the foregoing discussion, for simplicity the demarcation point was assumed to be at or near the point at which the communications line enters the customer premises. As one skilled in the art will readily appreciate, the demarcation can sometimes be a so-called 'extended demarc' in which the phone company agrees to assume responsibility to a point well into the customer premises. Substantially the same problems of assigning responsibility discussed above exist with an extended demarc, and the invention has similar advantages when applied to a situation involving an extended demarc.

In the foregoing discussion, for simplicity the demarcation point was described with reference to the division of responsibility between a communications service provider and an end-user customer. As one skilled in the art will readily appreciate, the various embodiments of this invention apply equally well to any situation in which there is a division or handoff of responsibility in a communications link. Other situations in which there are demarcations to which the various embodiments of this invention apply include, but are not limited to the demarcation or hand-off points between local access providers and long-distance carriers.

In another embodiment of the invention, the DIU 24 is proactive and if appropriate, initiates repair of the line. This repair may occur in situations where the fault is that the spans on either side of the demarcation point are configured differently. The DIU 24 can act as a bridge between the two spans by reconfiguring the data from one span to match the data on the other span and vice versa. This reconfiguring may take the form of, but not is limited to, reframing data on one span to a form appropriate for a second span. This repair may merely be a test to confirm a diagnosis or it may act as a stop-gap repair to restore service or keep equipment online.

It is to be understood that the apparatus and method of operation taught herein are illustrative of the invention. Modifications may readily be devised by those skilled in the art, without departing from the spirit or scope of the invention.

What is claimed is:

1. A diagnostic tool for remotely and collaboratively diagnosing a communication circuit, comprising:
   a diagnostic interface unit, linked to said communications circuit substantially at a demarcation point of said circuit, said interface unit including a configuration manager, a test-signal generator, a test-signal receiver and a communications port;
   a first and a second terminal; and,
   a data-link, connecting said terminals to said communications port such that the results from said test-signal receiver display substantially simultaneously on both said terminals.

2. The diagnostic tool of claim 1 wherein said communications circuit is a T1 line.

3. The diagnostic tool of claim 2 wherein said data-link includes the Internet.

4. The diagnostic tool of claim 3 wherein said data-link further includes a server.

5. The diagnostic tool of claim 4 wherein said data-link further includes a secure encrypted tunnel.

6. The diagnostic tool of claim 5 wherein said communications port is a modem.

7. The diagnostic tool of claim 6 wherein said modem is a 10/100BaseT connection.

8. A diagnostic tool for remote, collaborative management of a communications circuit, comprising:
   means for configuring said communications circuit;
   means located substantially at a demarcation point of said communications circuit for testing said configured circuit; and,
   means remote from said testing means for monitoring said testing and simultaneously displaying the results of said testing on two or more monitors.

9. The diagnostic tool of claim 8 wherein said communication circuit is a T1 line.

10. The diagnostic tool of claim 9 further including a means, remote from said testing means, for controlling both said means for configuring and said means for testing.

11. The diagnostic tool of claim 10 further including means for analyzing said results of testing.

12. The diagnostic tool of claim 11 further including means for monitoring said communications circuit while said circuit is in normal use, and local means for storing the data from said monitoring.

13. The diagnostic tool of claim 12 in which said means for analyzing is further capable of analyzing said data from said monitoring.

14. The diagnostic tool of claim 13 further including means for sending alerts while said communications circuit is in normal use.

15. The diagnostic tool of claim 14 further including means for initiating repair of a diagnosed fault by data reformatting.

16. A method of collaboratively and remotely testing a communications line, comprising the steps of:
    a) inserting a diagnostic interface unit into said communications line substantially at a demarcation point of said communications line;
    b) configuring said communications line;
    c) generating, by means of said diagnostic interface unit, a test-pattern on said configured communications line;
    d) monitoring, by means of said diagnostic interface unit, said generated test-pattern; and
    e) displaying, substantially simultaneously, on two or more monitors, the results of said step d) of monitoring.

17. The method of claim 16 in which said communications line is a T1 line.

18. The method of claim 17, further comprising the step f) analyzing said results of said step d) of monitoring; and wherein said step e) of displaying includes displaying the resultant analysis of said step f) of analyzing.

19. The method of claim 18, further comprising the step g) initiating repair of a diagnosed fault by data reformatting.

20. A collaborative remote T1 circuit diagnostic tool, comprising:
    a diagnostic interface unit, linked to said T1 circuit substantially at a demarcation point of said circuit, said interface unit including a MIB II compliant configuration manager, a T1 framing test-signal generator, an ESF format test-signal receiver, a control microprocessor and a 100BaseT communications port;
    a first remote terminal, located remote to said diagnostic interface unit;
    a second remote terminal, said second remote terminal being located remote to both said first terminal and to said diagnostic interface unit;
    a server, located remote to said diagnostic interface unit;
    a first-secure encrypted tunnel connecting said server to said diagnostic interface unit via the Internet;
    a second-secure encrypted tunnel connecting said server to said first remote terminal;
    a third-secure encrypted tunnel connecting said server to said second remote terminal;
    a remote, diagnostic-service software-module running on said server, said software module including a test-initiation module capable of initiating a test protocol on said diagnostic interface unit, a test-analysis module capable of analyzing the results of said test protocol, a test-repair unit capable of initiating repair of a diagnosed fault by data reformatting, and a GUI display module capable of displaying, substantially simultaneously, a graphic version of said analysis of said results on each of said remote terminals.

* * * * *